United States Patent
Baek et al.

(10) Patent No.: US 12,349,231 B2
(45) Date of Patent: Jul. 1, 2025

(54) METHOD AND DEVICE FOR TIME POINT FOR STARTING MBS CONFIGURATION

(71) Applicant: Samsung Electronics Co., Ltd., Gyeonggi-do (KR)

(72) Inventors: Sangkyu Baek, Gyeonggi-do (KR); Anil Agiwal, Gyeonggi-do (KR); Soenghun Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 316 days.

(21) Appl. No.: 17/912,279

(22) PCT Filed: Mar. 26, 2021

(86) PCT No.: PCT/KR2021/003777
§ 371 (c)(1),
(2) Date: Sep. 16, 2022

(87) PCT Pub. No.: WO2021/194303
PCT Pub. Date: Sep. 30, 2021

(65) Prior Publication Data
US 2023/0189395 A1 Jun. 15, 2023

(30) Foreign Application Priority Data
Mar. 26, 2020 (KR) .................. 10-2020-0037045

(51) Int. Cl.
*H04W 76/40* (2018.01)
*H04L 12/18* (2006.01)

(52) U.S. Cl.
CPC .......... *H04W 76/40* (2018.02); *H04L 12/189* (2013.01)

(58) Field of Classification Search
CPC ....... H04W 76/40; H04W 72/12; H04W 4/08; H04W 72/30; H04W 72/121; H04W 4/06;
(Continued)

(56) References Cited

U.S. PATENT DOCUMENTS 8,948,073 B2 2/2015 Kim et al.
9,693,372 B2 6/2017 Wang et al.
(Continued)

FOREIGN PATENT DOCUMENTS

KR 10-2015-0044213 4/2015
KR 10-1958898 3/2019
(Continued)

OTHER PUBLICATIONS

KR 20100057914 A) >>> Managing Acknowledgments in a Multicast Group Within a Wireless Network (see title) (Year: 2010).*
(Continued)

*Primary Examiner* — David Q Nguyen
(74) *Attorney, Agent, or Firm* — The Farrell Law Firm, P.C.

(57) ABSTRACT

The present disclosure relates to a communication technique which combines, with IoT technology a 5G communication system for supporting a data transmission rate higher than that of a 4G system, and a system therefor. The present disclosure can be applied to intelligent services (for example, smart homes, smart buildings, smart cities, smart cars or connected cars, healthcare, digital education, retail businesses, security- and safety-related services, and the like) on the basis of 5G communication technology and IoT-related technology. The present invention provides a method and device for a base station to notify a terminal of a time point for applying a configuration for MBS communication.

8 Claims, 11 Drawing Sheets

(58) Field of Classification Search
CPC . H04W 36/0007; H04W 48/10; H04W 48/20;
H04W 88/00; H04W 88/02; H04W 88/08;
H04W 88/18; H04W 92/18; H04W 76/00;
H04W 56/00; H04W 72/00; H04W 28/10;
H04W 24/10; H04L 12/189; H04L 12/16;
H04L 12/18; H04L 12/1845; H04L 47/15;
H04L 47/806; H04L 47/83; H04L
61/5069; H04L 65/611; Y02D 30/70;
G06F 9/542; G06F 3/1269; H04H 20/00;
H04H 20/44
USPC .................................. 370/312, 328, 329, 330
See application file for complete search history.

(56) References Cited

U.S. PATENT DOCUMENTS

| | | | |
|---|---|---|---|
| 10,123,296 | B2 | 11/2018 | Zhang |
| 10,225,820 | B2* | 3/2019 | Zhang et al. ....... H04W 72/005 |
| 10,462,839 | B2 | 10/2019 | Jung et al. |
| 2008/0170557 | A1* | 7/2008 | Yin ................................ 370/343 |
| 2011/0075600 | A1* | 3/2011 | Kim et al. .................... 370/312 |
| 2012/0257564 | A1* | 10/2012 | Kim et al. .................... 370/312 |
| 2013/0021961 | A1* | 1/2013 | Park .............................. 370/312 |
| 2018/0034652 | A1* | 2/2018 | Okazaki et al. ....... H04L 12/189 |
| 2018/0220394 | A1 | 8/2018 | Bontu et al. |
| 2020/0137529 | A1* | 4/2020 | Yu et al. ................. H04W 4/06 |
| 2020/0314844 | A1* | 10/2020 | Tomeba et al. ... H04W 72/0453 |
| 2021/0185566 | A1* | 6/2021 | Zhu ......................... H04W 4/70 |
| 2022/0210766 | A1* | 6/2022 | Liu et al. ............. H04W 72/005 |
| 2022/0338291 | A1* | 10/2022 | Hong ................... H04W 72/30 |
| 2023/0082017 | A1* | 3/2023 | Hong ..................... H04W 76/22 370/312 |
| 2023/0345310 | A1* | 10/2023 | Li .......................... H04W 4/06 |
| 2024/0365178 | A1* | 10/2024 | Li ..................... H04W 36/0007 |

FOREIGN PATENT DOCUMENTS

| | | |
|---|---|---|
| KR | 10-1961520 | 3/2019 |
| KR | 10-2021-0115470 | 9/2021 |
| WO | WO 2022/124264 | 6/2022 |

OTHER PUBLICATIONS

KR 20110023800 A) >>> Method of Transmitting Multicast Broadcast Service (see title) (Year: 2011).*
WO 2011115434 A2) >>> Multicast and Broadcast Service Resource Management Method and Device (see title) (Year: 2011).*
KR 20110104905 A) >>> Method and Apparatus for Managing Resource of Multicast and Broadcast Service (see title) (Year: 2011).*
KR 20120033419 A) >>> Apparatus and Method for Transmitting Information on Combination Power Headroom in Multiple Component Carrier System (see title; abstract) (Year: 2012).*
PCT/ISA/210 Search Report issued on PCT/KR2021/003777, Jul. 1, 2021 p. 5.
PCT/ISA/237 Written Opinion issued on PCT/KR2021/003777, Jul. 1, 2021, p. 4.
European Search Report dated Mar. 27, 2024 issued in counterpart application No. 21774236.0-1215, 5 pages.
European Search Report dated Jun. 16, 2023 issued in counterpart application No. 21774236.0-1215, 6 pages.

* cited by examiner

METHOD AND DEVICE FOR TIME POINT FOR STARTING MBS CONFIGURATION

PRIORITY

This application is a National Phase Entry of PCT International Application No. PCT/KR2021/003777, which was filed on Mar. 26, 2021, and claims priority to Korean Patent Application No. 10-2020-0037045, which was filed on Mar. 26, 2020, the entire content of each of which is incorporated herein by reference.

TECHNICAL FIELD

The disclosure relates to operations of a user equipment and a base station in a mobile communication system.

BACKGROUND ART

Since the commercialization of 4G communication systems, efforts have been made to develop improved 5G or pre-5G communication systems to meet the ever increasing demand for wireless data traffic. As such, 5G or pre-5G communication systems are also called "beyond 4G network" or "post LTE system". To achieve higher data rates, 5G communication systems are being considered for implementation in the extremely high frequency (mmWave) band (e.g., 60 GHz band). To decrease path loss and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems. Additionally, to improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multi-points (CoMP), interference cancellation, and the like. In addition, advanced coding and modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCALA) are also under development for 5G communication systems.

Meanwhile, the Internet is evolving from a human centered network where humans create and consume information into the Internet of Things (IoT) where distributed elements or things process and exchange information. There has also emerged the Internet of Everything (IoE) technology that combines IoT technology with big data processing technology through connection with cloud servers. To realize IoT services, base technologies related to sensing, wired/wireless communication and network infrastructure, service interfacing, and security are needed, and technologies interconnecting things such as sensor networks, machine-to-machine (M2M) or machine type communication (MTC) are under development. In IoT environments, it is possible to provide intelligent Internet technology services, which collect and analyze data created by interconnected things to add new values to human life. Through convergence and combination between existing information technologies and various field technologies, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, sensor networks and machine-to-machine or machine type communication are being realized by use of 5G communication technologies including beamforming, MIMO, and array antennas. Application of cloud RANs as a big data processing technique described above may be an instance of convergence of 5G technology and IoT technology.

DISCLOSURE OF INVENTION

Technical Problem

While a user equipment (UE) and a base station are performing MBS communication, when the base station needs to change the configuration for MBS communication, it may transmit a message for changing the corresponding configuration to the UE. The base station may instruct to change the configuration for MBS communication by using an RRC reconfiguration message or the like. However, the message that conveys the configuration for MBS communication may be not successfully delivered in the initial transmission and so may be retransmitted, resulting in a delay; or the messages for transmitting the configuration for MBS communication may be different for individual UEs, which may cause a difference in transmission time. Accordingly, the disclosure proposes a method capable of eliminating such a transmission time difference.

Solution to Problem

In order to solve the above problem, the disclosure is characterized in that the base station notifies the UE of the time point of applying the configuration for MBS communication.

Advantageous Effects of Invention

Through the disclosure, UEs receiving data of the same MBS communication can apply the configuration for MBS communication at the same time.

MODE FOR THE INVENTION

Figure 1:
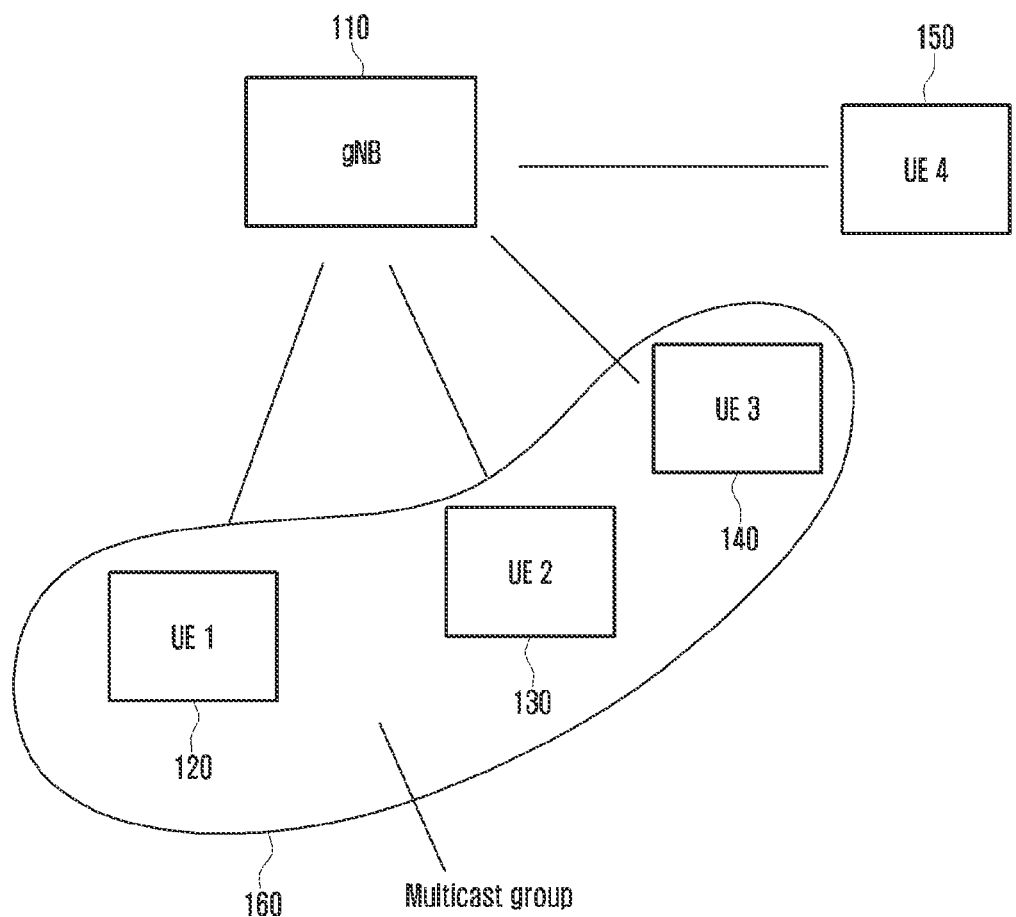
FIG. 1 is a diagram illustrating an operation scheme of MBS communication according to an embodiment of the disclosure.

Hereinafter, embodiments of the disclosure will be described in detail with reference to the accompanying drawings.

In the following description of embodiments of the disclosure, descriptions of technical details well known in the art and not directly related to the disclosure may be omitted. This is to more clearly convey the subject matter of the disclosure without obscurities by omitting unnecessary descriptions.

Likewise, in the drawings, some elements are exaggerated, omitted, or only outlined in brief. Also, the size of each element does not necessarily reflect the actual size. The same or similar reference symbols are used throughout the drawings to refer to the same or like parts.

Advantages and features of the disclosure and methods for achieving them will be apparent from the following detailed description of embodiments taken in conjunction with the accompanying drawings. However, the disclosure is not limited to the embodiments disclosed below but may be implemented in various different ways, the embodiments are provided only to complete the disclosure and to fully inform the scope of the disclosure to those skilled in the art to which the disclosure pertains, and the disclosure is defined only by the scope of the claims. The same reference symbols are used throughout the description to refer to the same parts.

Meanwhile, it will be appreciated that blocks of a flowchart and a combination of flowcharts may be executed by computer program instructions. These computer program instructions may be loaded on a processor of a general purpose computer, special purpose computer, or programmable data processing equipment, and the instructions executed by the processor of a computer or programmable data processing equipment create a means for carrying out functions described in blocks of the flowchart. To implement the functionality in a certain way, the computer program instructions may also be stored in a computer usable or readable memory that is applicable in a specialized computer or a programmable data processing equipment, and it is possible for the computer program instructions stored in a computer usable or readable memory to produce articles of manufacture that contain a means for carrying out functions described in blocks of the flowchart. As the computer program instructions may be loaded on a computer or a programmable data processing equipment, when the computer program instructions are executed as processes having a series of operations on a computer or a programmable data processing equipment, they may provide steps for executing functions described in blocks of the flowchart.

Each block of a flowchart may correspond to a module, a segment or a code containing one or more executable instructions for executing one or more logical functions, or to a part thereof. It should also be noted that functions described by blocks may be executed in an order different from the listed order in some alternative cases. For example, two blocks listed in sequence may be executed substantially at the same time or executed in reverse order according to the corresponding functionality.

Here, the word "unit", "module", or the like used in the embodiments may refer to a software component or a hardware component such as an FPGA or ASIC capable of carrying out a function or an operation. However, "unit" or the like is not limited to hardware or software. A unit or the like may be configured so as to reside in an addressable storage medium or to drive one or more processors. For example, units or the like may refer to components such as a software component, object-oriented software component, class component or task component, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose larger components and units. Components and units may be implemented to drive one or more processors in a device or a secure multimedia card. Also, a unit may include one or more processors in an embodiment.

FIG. 1 is a diagram illustrating an operation scheme of MBS communication according to an embodiment of the disclosure. Multicast and broadcast service (MBS) communication refers to a method in which one transmitting device communicates with several receiving devices in a mobile communication system. Here, the transmitting device may be a base station, and each receiving device may be a UE. However, without being limited thereto, the transmitting device may be a UE.

The embodiment of FIG. 1 shows an example of performing MBS communication where a base station (gNB) 110 is a transmitting device and UEs 120, 130, 140 and 150 are receiving devices. This MBS communication may be a broadcast for multiple unspecified receiving devices, or may be a multicast for multiple specified receiving devices. If communication is performed in a multicast scheme, the base station may configure only specific UEs to receive corresponding multicast packets. To this end, a set of UEs to perform a specific multicast communication may be formed., and is referred to as a multicast group 160 in the embodiment of FIG. 1.

UEs belonging to a multicast group are allocated the same group-radio network temporary identity (G-RNTI), so that they can receive data allocated with the corresponding G-RNTI. It is assumed in the embodiment of FIG. 1 that UE 1 (120), UE 2 (130), and UE 3 (140) are configured as one multicast group and are allocated the same G-RNTI to receive data from the base station 110 in a multicast manner. UE 4 (150) is not allocated the same G-RNTI because it is not included in the multicast group, and hence UE 4 (150) cannot receive the data, which can be received by UE 1 (120), UE 2 (130), and UE 3 (140) from the base station.

One or more multicast groups may be configured in the coverage of the base station 110, and each multicast group may be identified by a G-RNTI. One UE may be allocated one or more G-RNTIs from the base station 110. The UE may receive multicast data by using the G-RNTI value allocated in connected mode (RRC connected mode) not only in connected mode but also in idle mode (RRC idle mode) or inactive mode (RRC inactive mode). The G-RNTI may be configured when the UE is in connected mode by being included in at least one message among RRC reconfiguration, RRC setup, and RRC reestablishment messages. However, without being limited thereto, the G-RNTI may be transmitted from the base station by being included in a system information block (SIB) as a G-RNTI value that can be received by a UE. Upon being configured with a G-RNTI value in this way, the UE may apply the G-RNTI value thereafter.

Figure 2:
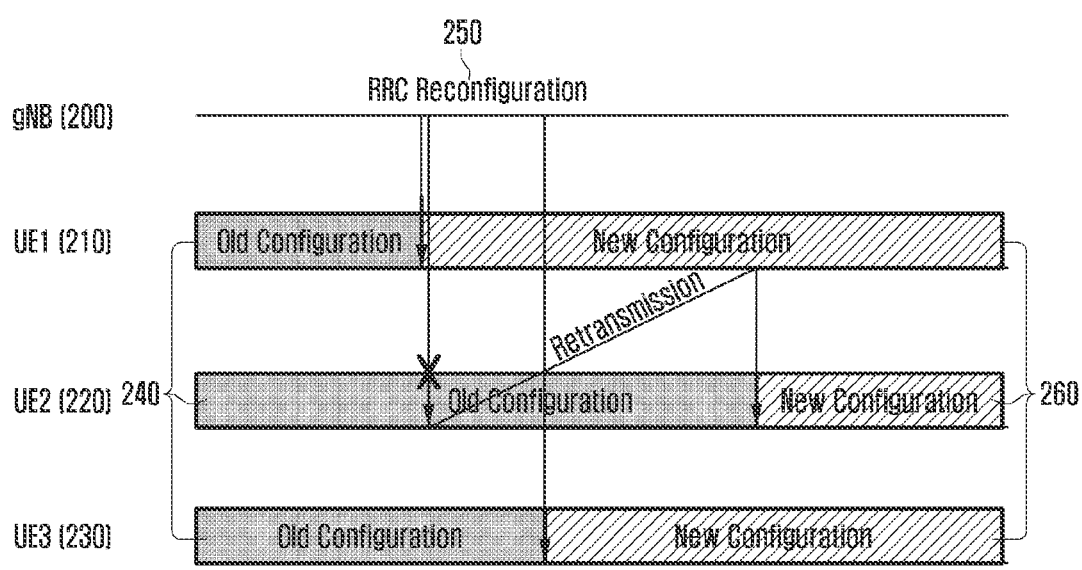
FIG. 2 is a diagram illustrating a problem in that the time at which the MBS configuration is applied varies.

FIG. 2 is a diagram illustrating a problem in that the time at which the MBS configuration is applied varies. The base station 200 may allow a plurality of UEs to perform MBS communication. That is, the base station may transmit multicast data to a UE configured with MBS communication, and a UE belonging to the multicast group may receive multicast data. FIG. 2 shows that three user equipments (UEs) 210, 220 and 230 are performing MBS communication. Here, UEs performing MBS communication may perform MBS communication based on an existing configuration (old configuration) applied at a previous time. The configuration for MBS communication may include at least of a G-RNTI value for receiving the MBS service, detailed settings of a point-to-multipoint (PTM) radio bearer to be received with the G-RNTI, or other setting values for MBS communication. These setting values may be included in an RRC reconfiguration message 250. In FIG. 2, it is assumed that each UE has received an RRC reconfiguration message at a time point before being shown in FIG. 2 and has performed MBS communication by applying the existing configuration 240.

In the meantime, when the base station needs to change the configuration for MBS communication, it may transmit a message for changing the corresponding configuration to the UE (250). In the embodiment of FIG. 2, it is assumed that the corresponding configuration is changed using an RRC reconfiguration message, but the corresponding message may use a different message format. The base station may instruct to change the configuration for MBS communication by using an RRC reconfiguration message or the like, but the time points at which this message arrives to the UEs may be different. The message conveying the configuration for MBS communication may be not successfully transmitted in the initial transmission and may experience a delay due to retransmission, or the message conveying the configuration for MBS communication may be different for individual UEs, which may cause a difference in transmission time. It is illustrated in FIG. 2 that although the RRC reconfiguration message is initially transmitted at the same time to UE 1 (210) and UE 2 (220), whereas UE 1 successfully receives the corresponding message, UE 2 fails to initially receive the corresponding message and experiences a delay in successful message reception due to retransmission. On the other hand, it is assumed that the RRC reconfiguration message is transmitted to UE 3 (230) at a time different from the time at which the RRC reconfiguration message is initially transmitted to UE 1 and UE 2. For these reasons, the time points at which individual UEs apply the new configuration 260 for MBS communication may be different. However, from the viewpoint of the base station, which is a transmitting device for MBS communication, there should be only one time point for applying a new configuration for the corresponding MBS communication. Hence, if the time point of applying a new configuration is different for each UE, the configuration for MBS communication applied by some UEs and the configuration for MBS communication applied by the base station may become different. For this reason, a situation may occur in which a UE cannot normally perform MBS communication for a certain period of time. The disclosure proposes a method for UEs receiving data of the same MBS communication to simultaneously apply the configuration for MBS communication.

Figure 3:
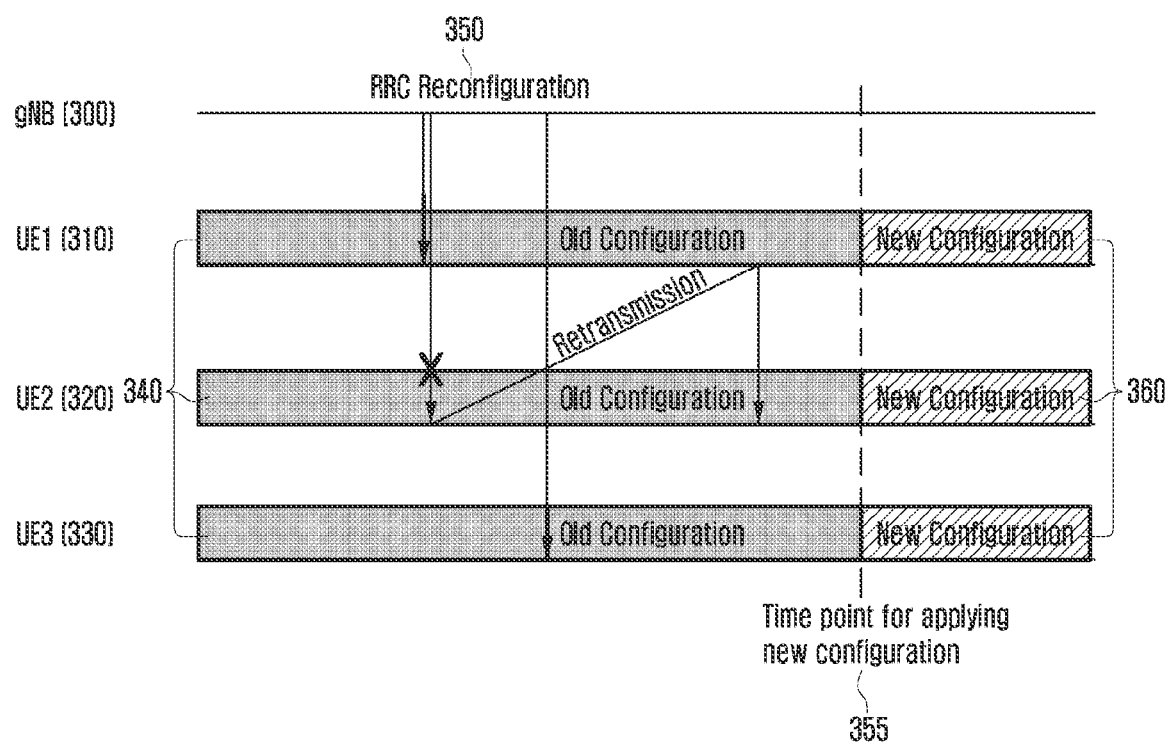
FIG. 3 is a diagram illustrating a scheme for the base station and UEs to apply a configuration for MBS communication.

FIG. 3 is a diagram illustrating a scheme for the base station and UEs to apply a configuration for MBS communication. The base station 300 may allow plural UEs to perform MBS communication. That is, the base station may transmit multicast data to a UE configured with MBS communication, and a UE belonging to the multicast group may receive multicast data. The embodiment of FIG. 3 shows that three UEs 310, 320 and 330 are performing MBS communication. Here, UEs performing MBS communication may perform MBS communication based on an existing configuration (old configuration) applied at a previous time. The configuration for MBS communication may include at least of a G-RNTI value for receiving the MBS service, detailed settings of a point-to-multipoint (PTM) radio bearer to be received with the G-RNTI, or other setting values for MBS communication. These setting values may be included in an RRC reconfiguration message 350. However, in FIG. 3, it is assumed that each UE has received an RRC reconfiguration message at a time point before being shown in FIG. 3 and has performed MBS communication by applying the existing configuration 340.

In the meantime, when the base station needs to change the configuration for MBS communication, it may transmit a message for changing the corresponding configuration to the UE (350). In the embodiment of FIG. 3, it is assumed that the corresponding configuration is changed using an RRC reconfiguration message 350, but the corresponding message may use a different message format. The base station may instruct to change the configuration for MBS communication by using an RRC reconfiguration message or the like, but the time points at which this message arrives to the UEs may be different. The message conveying the configuration for MBS communication may be not successfully transmitted in the initial transmission and may experience a delay due to retransmission, or the message conveying the configuration for MBS communication may be different for individual UEs, which may cause a difference in transmission time. It is illustrated in the embodiment of FIG. 3 that although the RRC reconfiguration message is initially transmitted at the same time to UE 1 (310) and UE 2 (320), whereas UE 1 successfully receives the corresponding message, UE 2 fails to initially receive the corresponding message and experiences a delay in successful message reception due to retransmission. On the other hand, it is assumed that the RRC reconfiguration message is transmitted to UE 3 (330) at a time different from the time at which the RRC reconfiguration message is initially transmitted to UE 1 and UE 2. For these reasons, the time points at which individual UEs successfully receive a new configuration for MBS communication may become different.

However, since the time point at which the base station 300 applies the new configuration is a single time point, the base station needs to notify the UE of the time point 355 at which the new configuration is applied. Then, the UE can apply the corresponding configuration from the time point when the new configuration for MBS communication is applied.

In the embodiment of FIG. 3, the base station notifies the UE of a time point 355 for applying the configuration for MBS communication. Such information may be included in a message for transmitting the configuration for MBS communication, for example, an RRC reconfiguration message 350. Specifically, the UE receives a time point for applying a new configuration for MBS communication from the base station. Such information may typically be a system frame number (SFN) value. If the UE receives an SFN value for applying a new configuration for MBS communication, the new configuration may be applied at the SFN boundary with the corresponding SFN that first arrives in the coming future. In another embodiment, to specifically set the time to apply a new configuration for MBS communication, at least one of a subframe number, a slot number, or a symbol number may be additionally included as well as the SFN value. For example, when receiving an SFN, a slot number, and a symbol number, the new configuration may be applied at a time when the corresponding symbol number starts in the corresponding slot number of the corresponding SFN. The UE may apply the new configuration based on the boundary point indicated by the SFN, subframe number, slot number, and symbol number received from the PCell. In this case, all UEs using a configuration for the corresponding MBS communication can apply the new configuration 360 at the same time. If a UE receives a configuration for MBS communication that does not include a time point for applying the new configuration, the UE may immediately apply the new configuration.

Figure 4:
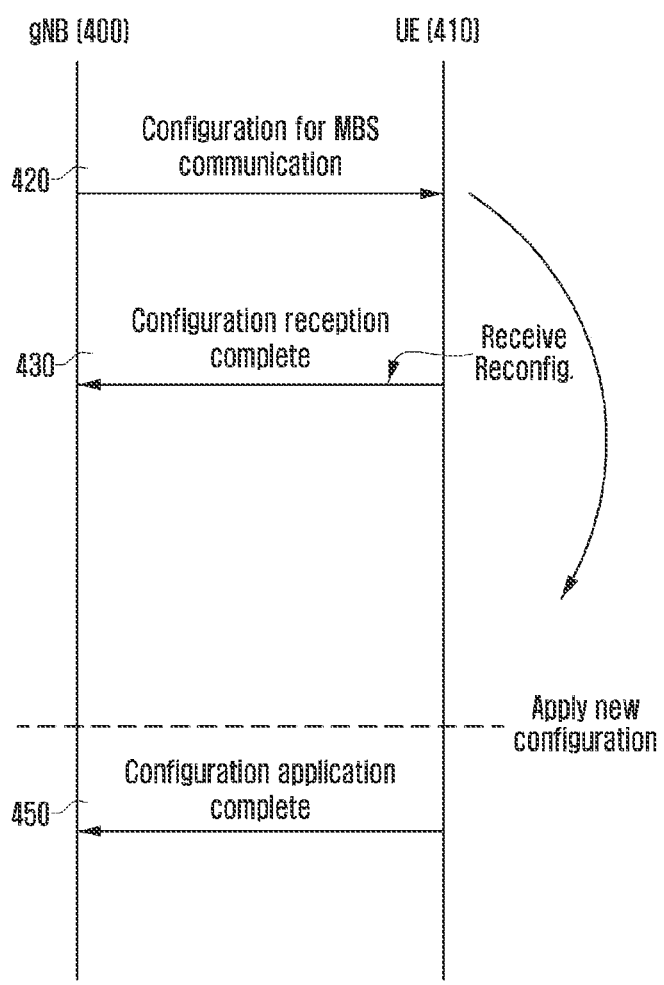
FIG. 4 shows a scheme of handling messages for the configuration for MBS communication.

FIG. 4 shows a scheme of handling messages for the configuration for MBS communication. As shown in the embodiment of FIG. 3, even when the UE 410 receives a configuration message 420 for MBS communication from the base station 400, the UE 410 may not immediately apply the configuration for MBS communication indicated in this message. Instead, it is necessary to notify the base station that the configuration message for the corresponding MBS communication has been successfully received. To this end, when the UE successfully receives a configuration message for MBS communication and completes decoding of it, the UE may transmit the base station a message 430 indicating completion of reception of the corresponding configuration. More specifically, if the UE not only successfully receives the configuration message for MBS communication but also plans to apply the corresponding configuration, the UE may trigger a message indicating that the reception of the corresponding configuration has been completed. Thereafter, the corresponding message can be transmitted via an uplink radio resource available for transmission. If the configuration message for MBS communication is an RRC reconfiguration message and the configuration reception complete message is an RRC reconfiguration complete message, the time point at which the RRC reconfiguration complete message is triggered is not the time when the reconfiguration for the corresponding message is completed but the time when the reception of the corresponding message is completed. If the RRC reconfiguration message includes both a configuration for MBS communication and other UE configuration, the configuration for MBS communication may be applied at the specified application time 440, the other UE configuration may be applied at the time when the RRC reconfiguration message 420 is received, and thereafter the RRC reconfiguration complete message 430 may be transmitted. Thereafter, the UE applies a new configuration for MBS communication at the time of applying the configuration included in the configuration message for MBS communication (440). Then, a configuration application complete message 450 informing that the configuration for the corresponding MBS communication has been applied may be transmitted to the base station. This message may include an RRC reconfiguration complete message or contents informing that MBS communication related settings have been applied. However, in another embodiment, a separate RRC message may be transmitted or a medium access control—control element (MAC CE) format may be used. In addition, only one of the configuration reception complete message 430 and the configuration application complete message 450 may be transmitted. Which of the two messages to be transmitted may be configured in advance by the base station.

Figure 5:
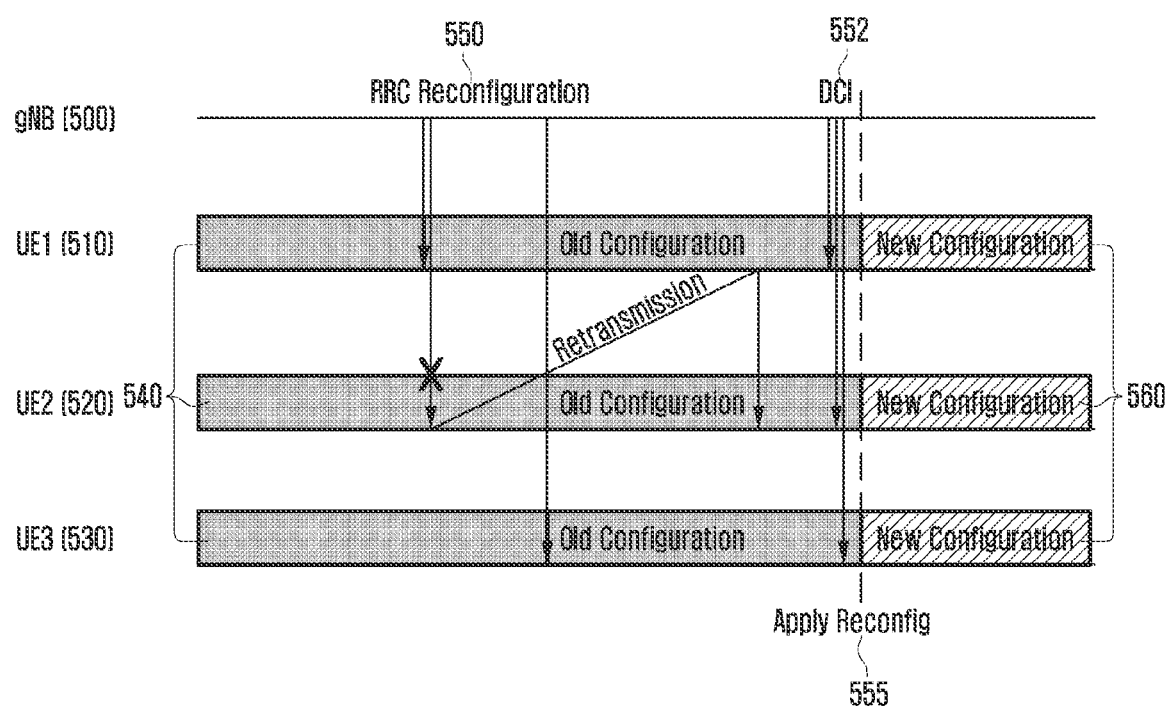
FIG. 5 is a diagram illustrating a scheme for the base station and UEs to apply a configuration for MBS communication.

FIG. 5 is a diagram illustrating a scheme for the base station and UEs to apply a configuration for MBS communication. The base station 500 may allow plural UEs to perform MBS communication. That is, the base station may transmit multicast data to a UE configured with MBS communication, and a UE belonging to the multicast group may receive multicast data. The embodiment of FIG. 5 shows that three UEs 510, 520 and 530 are performing MBS communication. Here, UEs performing MBS communication may perform MBS communication based on an existing configuration (old configuration) applied at a previous time. The configuration for MBS communication may include at least of a G-RNTI value for receiving the MBS service, detailed settings of a point-to-multipoint (PTM) radio bearer to be received with the G-RNTI, or other setting values for MBS communication. These setting values may be included in an RRC reconfiguration message 550. However, in FIG. 5, it is assumed that each UE has received an RRC reconfiguration message at a time point before being shown in FIG. 5 and has performed. MBS communication by applying the existing configuration 540.

In the meantime, when the base station needs to change the configuration for MBS communication, it may transmit a message for changing the corresponding configuration to the UE (550). In the embodiment of FIG. 5, it is assumed that the corresponding configuration is changed using an RRC reconfiguration message, but the corresponding message may use a different message format. The message for changing the configuration for MBS communication in FIG. 5 may include multiple configurations for MBS communication to be delivered. However, for one UE, only one configuration may be applied at a time. To identify which configuration to be applied later, each configuration for MBS communication may have a configuration identity (configuration ID). The base station may instruct to change the configuration for MBS communication by using an RRC reconfiguration message or the like, but the time points at which this message arrives to the UEs may be different. The message conveying the configuration for MBS communication may be not successfully transmitted in the initial transmission and may experience a delay clue to retransmission, or the message conveying the configuration for MBS communication may be different for individual UEs, which may cause a difference in transmission time. It is illustrated in the embodiment of FIG. 5 that although the RRC reconfiguration message is initially transmitted at the same time to UE 1 (510) and UE 2 (520), whereas UE 1 successfully receives the corresponding message, UE 2 fails to initially receive the corresponding message and experiences a delay in successful message reception due to retransmission. On the other hand, it is assumed that the RRC reconfiguration message is transmitted to UE 3 (530) at a time different from the time at which the RRC reconfiguration message is initially transmitted to UE 1 and UE 2. For these reasons, the time points at which individual UEs successfully receive a new configuration for MBS communication may become different.

However, since the time point at which the base station 500 applies the new configuration becomes one time point, all UEs need to simultaneously apply the, time point 555 at which the new configuration is applied. Then, the UE can apply the corresponding configuration from the time point when the new configuration for MBS communication is applied.

The embodiment of FIG. 5 shows a scheme in which the base station notifies the UEs that the configuration for MBS communication should be applied at the time 555 of applying the configuration for MBS communication by transmitting downlink control information (DCI) on the physical downlink control channel (PDCCH) (552). This DCI may include information instructed by the base station to the UE that the configuration for MBS communication preset at step 550 should be actually applied. If plural configurations have been delivered to the UE at step 550, the DCI may include a configuration ID to identify the configuration to be applied. Thereby, the UE can determine the configuration to be applied for MBS communication. The DCI transmitted here may be information indicated by a preset G-RNTI. However, if UEs performing the same MBS communication can receive DCI at the same time, DCI indicated by a different RNTI may be used. This DCI may be in the form of a common resource that can be received by all UEs performing the corresponding MBS communication. A UE configured with a new configuration for MBS communication may apply the new configuration immediately upon receiving the corresponding DCI (555), However, in another embodiment, the corresponding configuration may be applied after a preset time from the time when the corresponding DCI is received. The length of the preset time may be set by RRC configuration or the like. As the DCI on the PDCCH is considered to have high transmission stability, UEs receiving the DCI can apply the new configuration at the same time.

Figure 6:
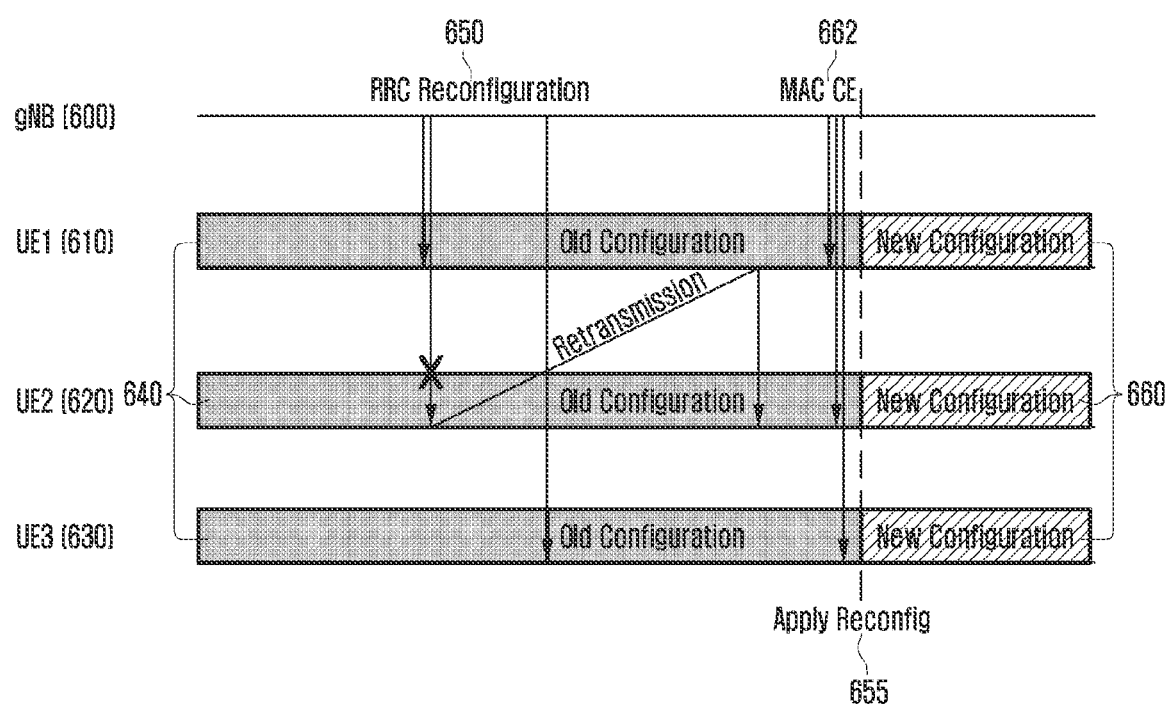
FIG. 6 is a diagram illustrating a scheme for the base station and UEs to apply a configuration for MBS communication.

FIG. 6 is a diagram illustrating a scheme for the base station and UEs to apply a configuration for MBS communication. The base station 600 may allow plural UEs to perform MBS communication. That is, the base station may transmit multicast data to a UE configured with MBS communication, and a UE belonging to the multicast group may receive multicast data. The embodiment of FIG. 6 shows that three UEs 610, 620 and 630 are performing MBS communication. Here, UEs performing MBS communication may perform MBS communication based on an existing configuration (old configuration) applied at a previous time. The configuration for MBS communication may include at least of a G-RNTI value for receiving the MBS service, detailed settings of a point-to-multipoint (PTM) radio bearer to be received with the G-RNTI, or other setting values for MBS communication. These setting values may be included in an RRC reconfiguration message 650. However, in FIG. 6, it is assumed that each UE has received an RRC reconfiguration message at a time point before being shown in FIG. 6 and has performed MBS communication by applying the existing configuration 640.

In the meantime, when the base station needs to change the configuration for MBS communication, it may transmit a message for changing the corresponding configuration to the UE (650). In the embodiment of FIG. 6, it is assumed that the corresponding configuration is changed using an RRC reconfiguration message, but the corresponding message may use a different message format. The message for changing the configuration for MBS communication in FIG. 6 may include multiple configurations for MBS communication to be delivered. However, for one UE, only one configuration may be applied at a time. To identify which configuration to be applied later, each configuration for MBS communication may have a configuration identity (configuration ID). The base station may instruct to change the configuration for MBS communication by using an RRC reconfiguration message or the like, but the time points at which this message arrives to the UEs may be different. The message conveying the configuration for MBS communication may be not successfully transmitted in the initial transmission and may experience a delay clue to retransmission, or the message conveying the configuration for MBS communication may be different for individual UEs, which may cause a difference in transmission time. It is illustrated in the embodiment of FIG. 6 that although the RRC reconfiguration message is initially transmitted at the same time to UE 1 (610) and UE 2 (620), whereas UE 1 successfully receives the corresponding message, UE 2 fails to initially receive the corresponding message and experiences a delay in successful message reception due to retransmission. On the other hand, it is assumed that the RRC reconfiguration message is transmitted to UE 3 (630) at a time different from the time at which the RRC reconfiguration message is initially transmitted to UE 1 and 2. For these reasons, the time points at which individual UEs successfully receive a new configuration for MBS communication may become different.

However, since the time point at which the base station 600 applies the new configuration becomes one time point, all UEs need to simultaneously apply the time point 655 at which the new configuration is applied. Then, the UE can apply the corresponding configuration from the time point when the new configuration for MBS communication is applied.

The embodiment of FIG. 6 shows a scheme in which the base station notifies the UEs that the configuration for MBS communication should be applied at the time 655 of applying the configuration for MBS communication by transmitting a MAC CE (662). This MAC CE may include information instructed by the base station to the UE that the configuration for MBS communication preset at step 650 should be actually applied. If plural configurations have been delivered to the UE at step 650, the MAC CE may include a configuration ID to identify the configuration to he applied. Thereby, the UE can determine the configuration to be applied for MBS communication. The MAC CE transmitted here may be information indicated by a preset G-RNTI. However, if UEs performing the same MBS communication can receive the MAC CE at the same time, a MAC CE indicated by a different RNTI may be used. This MAC CE may be in the form of a common resource that can be received by all UEs performing the corresponding MBS communication. A UE configured with a new configuration for MBS communication may apply the new configuration immediately upon receiving the corresponding MAC CE (655). However, in another embodiment, the corresponding configuration may be applied after a preset time from the time when the corresponding MAC CE is received. The length of the preset time may be set by RRC configuration or the like. Although the MAC CE may be delayed due to hybrid automatic repeat request (HARQ), as the delay length is only a few milliseconds, it can be considered that transmission stability is high, so that UEs receiving the MAC CE can apply the new configuration at almost the same time.

Figure 7:
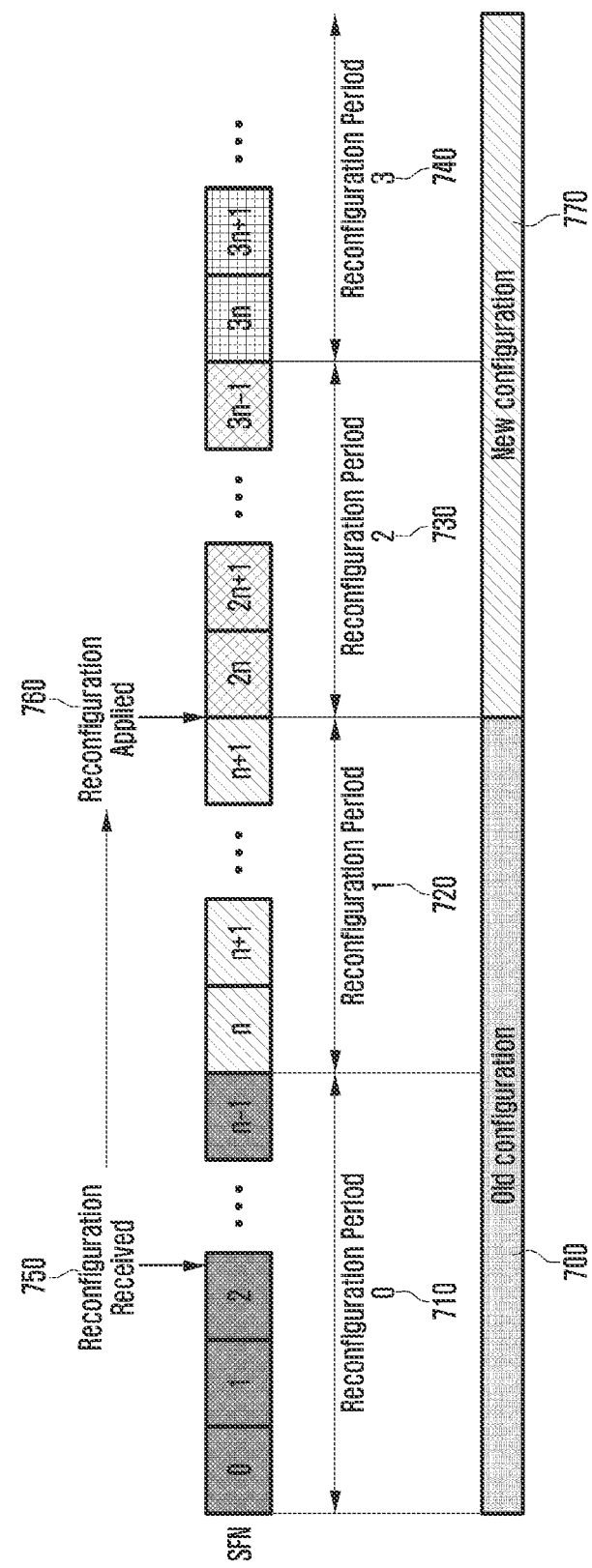
FIG. 7 is a diagram illustrating a scheme for setting an MBS reconfiguration period to allow the base station and UEs to apply a configuration for MBS communication.

FIG. 7 is a diagram illustrating a scheme for setting an MBS reconfiguration period to allow the base station and UEs to apply a configuration for MBS communication. The base station may allow plural UEs to perform MBS communication. That is, the base station may transmit multicast data to a UE configured with MBS communication, and a UE belonging to the multicast group may receive multicast data. Here, UEs performing MBS communication may perform MBS communication based on an existing configuration applied at a previous time. The configuration for MBS communication may include at least of a G-RNTI value for receiving the MBS service, detailed settings of a point-to-multipoint (PTM) radio bearer to be received with the G-RNTI, or other setting values for MBS communication. These setting values may be included in an RRC reconfiguration message. Alternatively, the corresponding settings may be transmitted by a system information block (SIB) for MBS configuration. However, in FIG. 7, it is assumed that each UE has received an RRC reconfiguration message or system information block at a time point before being shown in FIG. 7 and has performed MBS communication by applying the existing configuration 700.

In the meantime, when the base station needs to change the configuration for MBS communication, it may transmit a message for changing the corresponding configuration to the UE (750). In the embodiment of FIG. 7, it is assumed that the corresponding configuration is changed using an RRC reconfiguration message, but the corresponding message may use a different message format like a system information block. The base station may instruct to change the configuration for MBS communication by using an RRC reconfiguration message or system information block, but the time points at which this message arrives to the UEs may be different. The message conveying the configuration for MBS communication may be not successfully transmitted in the initial transmission and may experience a delay due to retransmission, or the message conveying the configuration for MBS communication may be different for individual UEs, which may cause a difference in transmission time. However, since the time point at which the base station applies the new configuration becomes one time point, the time point at which the new configuration is applied needs to be the same between the UEs performing MBS communication. Then, the UE can apply the corresponding configuration 770 from the time point when the new configuration for MBS communication is applied (760).

To this end, in the embodiment of FIG. 7, the concept of an MBS reconfiguration period may be introduced. The periodicity of the MBS reconfiguration period may be set to an integer multiple of the system frame number (SFN) or a time length, and the MBS reconfiguration period may be repeated with corresponding periodicity. In the embodiment of FIG. 7, it is assumed that the periodicity of the MBS reconfiguration period is set to the length of n SFNs. Then, every time n SFNs pass, a new MBS reconfiguration period may be started. Hence, the zeroth MBS reconfiguration period may be from SFN 0 to SFN n-1 (710), the first MBS reconfiguration period may be from SFN n to SFN 2n-1 (720), the second MBS reconfiguration period may be from SFN 2n to SFN 3n-1 (730), and the third MBS reconfiguration period may be from SFN 3n to SFN 4n-1 (740). If the quotient is m when the current SFN value is divided by n, which is the periodicity of the MBS reconfiguration period, the corresponding SFN time is located in the $m^{th}$ MBS reconfiguration period. The periodicity of the MBS reconfiguration period may be configured by the base station to the UE by including it in a system information block or RRC reconfiguration message. The base station may additionally set the length of k MBS reconfiguration periods required by the UE to actually apply the configuration after receiving the configuration for MBS communication. The k value may be configured by the base station to the UE by including it in a system information block or RRC reconfiguration message.

When the UE receives a new configuration for MBS communication (750), it does not immediately apply the corresponding message but applies the received configuration for MBS communication after passing through k whole or partial MBS reconfiguration periods. Specifically, when a UE receives a message indicating a new configuration for MBS communication in the $x^{th}$ MBS reconfiguration period, it may apply the corresponding reconfiguration from the start of the $x+k+1^{th}$ MBS reconfiguration period. (if x+k+1 is greater than the minimum integer not less than [(maximum SFN value+1)/n], apply the remainder when x+k+1 is divided by the minimum integer not less than [(maximum SFN value+1)/n]) FIG. 7 shows a case where a configuration message for MBS communication is received in the $0^{th}$ MBS reconfiguration period (x=0), and k is 1. Hence, the received configuration for MBS communication may be applied at the start of the $2^{nd}$ MBS reconfiguration period (760, 770).

In another embodiment, when the UE receives a new configuration for MBS communication (750), it does not immediately apply the corresponding message but applies the received configuration for MBS communication after passing through k whole or partial MBS reconfiguration periods. Specifically, when a UE receives a message indicating a new configuration for MBS communication in the $x^{th}$ MBS reconfiguration period, it may apply the corresponding reconfiguration from the start of the $x+k^{th}$ MBS reconfiguration period. (if x+k is greater than the minimum integer not less than [(maximum SFN value+1)/n], apply the remainder when x+k is divided by the minimum integer not less than [(maximum SFN value+1)/n]) FIG. 7 shows a case where a configuration message for MBS communication is received in the $0^{th}$ MBS reconfiguration period (x=0), and k is 2. Hence, the received configuration for MBS communication may be applied at the start of the $2^{nd}$ MBS reconfiguration period (760, 770).

The embodiment of FIG. 7 may be combined with the embodiment of FIG. 4 to perform a procedure of receiving a configuration message for MBS communication and reporting completion. In the embodiment of FIG. 7, even if a UE 410 receives a configuration message 420 or 750 for MBS communication from the base station 400, the UE 410 may not immediately apply the configuration for MBS communication indicated in this message. Instead, it is necessary to notify the base station that the configuration message for corresponding MBS communication has been successfully received. To this end, when the UE successfully receives a configuration message for MBS communication and completes decoding of it, the UE may transmit the base station a message 430 indicating completion of reception of the corresponding configuration. More specifically, if the UE not only successfully receives the configuration message for MBS communication but also plans to apply the corresponding configuration, the UE may trigger a message indicating that the reception of the corresponding configuration has been completed. Thereafter, the corresponding message can be transmitted via an uplink radio resource available for transmission. If the configuration message for MBS communication is an RRC reconfiguration message and the configuration reception complete message is an RRC reconfiguration complete message, the time point at which the RRC reconfiguration complete message is triggered is not the time when the reconfiguration for the corresponding message is completed but the time when the reception of the corresponding message is completed. If the RRC reconfiguration message includes both a configuration for MBS communication and other UE configuration, the configuration for MBS communication may be applied at the specified application time 440 or 760, the other UE configuration may be applied at the time when the RRC reconfiguration message 420 or 750 is received, and thereafter the RRC reconfiguration complete message 430 may be transmitted. Thereafter, the UE applies a new configuration for MBS communication at the time of applying the configuration included in the configuration message for MBS communication (440 or 760). Then, a configuration application complete message 450 informing that the configuration for the corresponding MBS communication has been applied may be transmitted to the base station. This message may be used in the form of an RRC reconfiguration complete message including contents informing that MBS communication related settings have been applied. However, in another embodiment, a separate RRC message may be used or a medium access control—control element (MAC CE) format may be used. In addition, only one of the configuration reception complete message 430 and the configuration application complete message 450 may be used. Which of the two messages to be used may be configured in advance by the base station.

Figure 8:
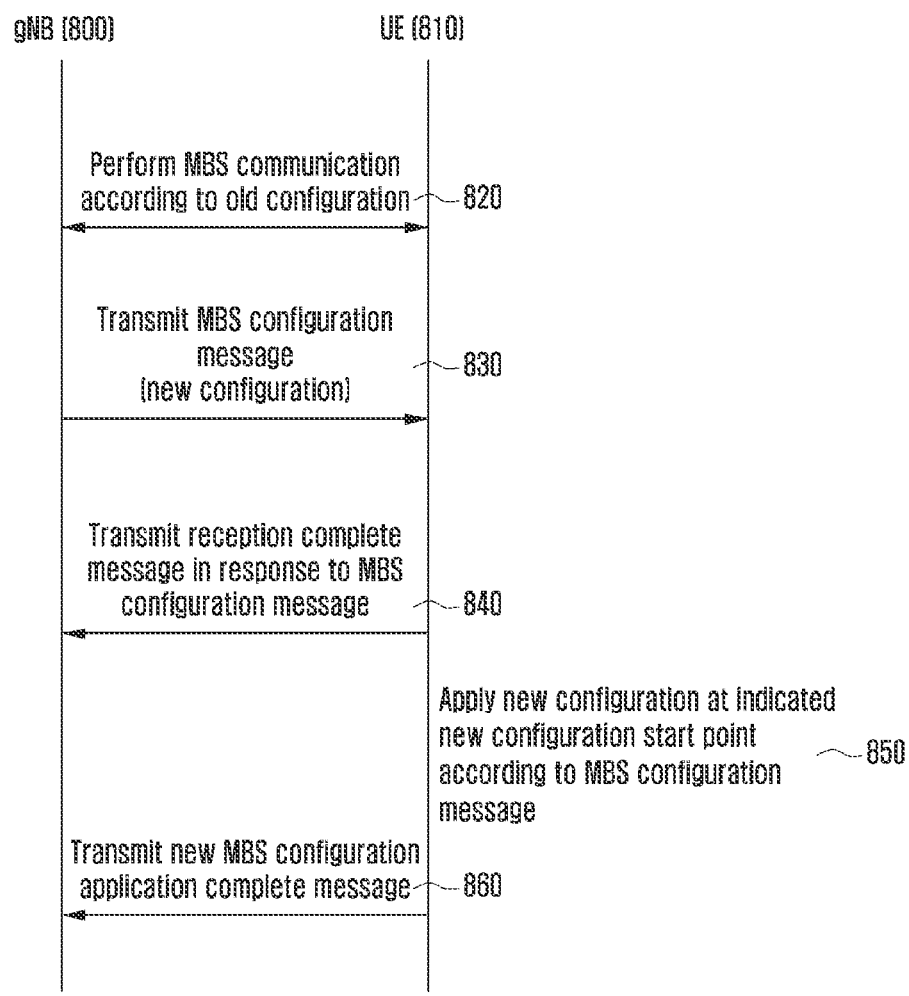
FIG. 8 is a flow diagram illustrating a scheme of handling messages for the configuration for MBS communication according to an embodiment of the disclosure.

FIG. 8 is a flow diagram illustrating a scheme of handling messages for the configuration for MBS communication according to an embodiment of the disclosure.

In FIG. 8, it is assumed that each UE performs MBS communication by applying the existing configuration (820) after receiving an RRC reconfiguration message or a system information block.

When the base station needs to change the configuration for MBS communication, it may transmit a message for changing the corresponding configuration to the UE (830). The base station may instruct to change the configuration for MBS communication by using an RRC reconfiguration message or system information block, but the time points at which this message arrives to the UEs may be different. The message conveying the configuration for MBS communication may be not successfully transmitted in the initial transmission and may experience a delay due to retransmission, or the message conveying the configuration for MBS communication may be different for individual UEs, which may cause a difference in transmission time. However, since the time point at which the base station applies the new configuration becomes one time point, the time point at which the new configuration is applied needs to be the same between the UEs performing MBS communication. Hence, the message for changing the configuration for MBS communication may include information on the time point at which the new configuration is applied.

Even if the UE 810 receives a configuration message 830 for MBS communication from the base station 800, the UE 810 may not immediately apply the configuration for MBS communication indicated in this message. Instead, it is necessary to notify the base station that the configuration message for corresponding MBS communication has been successfully received. To this end, when the UE successfully receives a configuration message for MBS communication and completes decoding of it, the UE may transmit the base station a message 840 indicating completion of reception of the corresponding configuration. Thereafter, the UE applies a new configuration for MBS communication at the time of applying the configuration included in the configuration message for MBS communication (850). Then, a configuration application complete message 860 informing that the configuration for the corresponding MBS communication has been applied may be transmitted to the base station. This message may include an RRC reconfiguration complete message or contents indicating that the MBS communication related settings have been applied.

Figure 9:
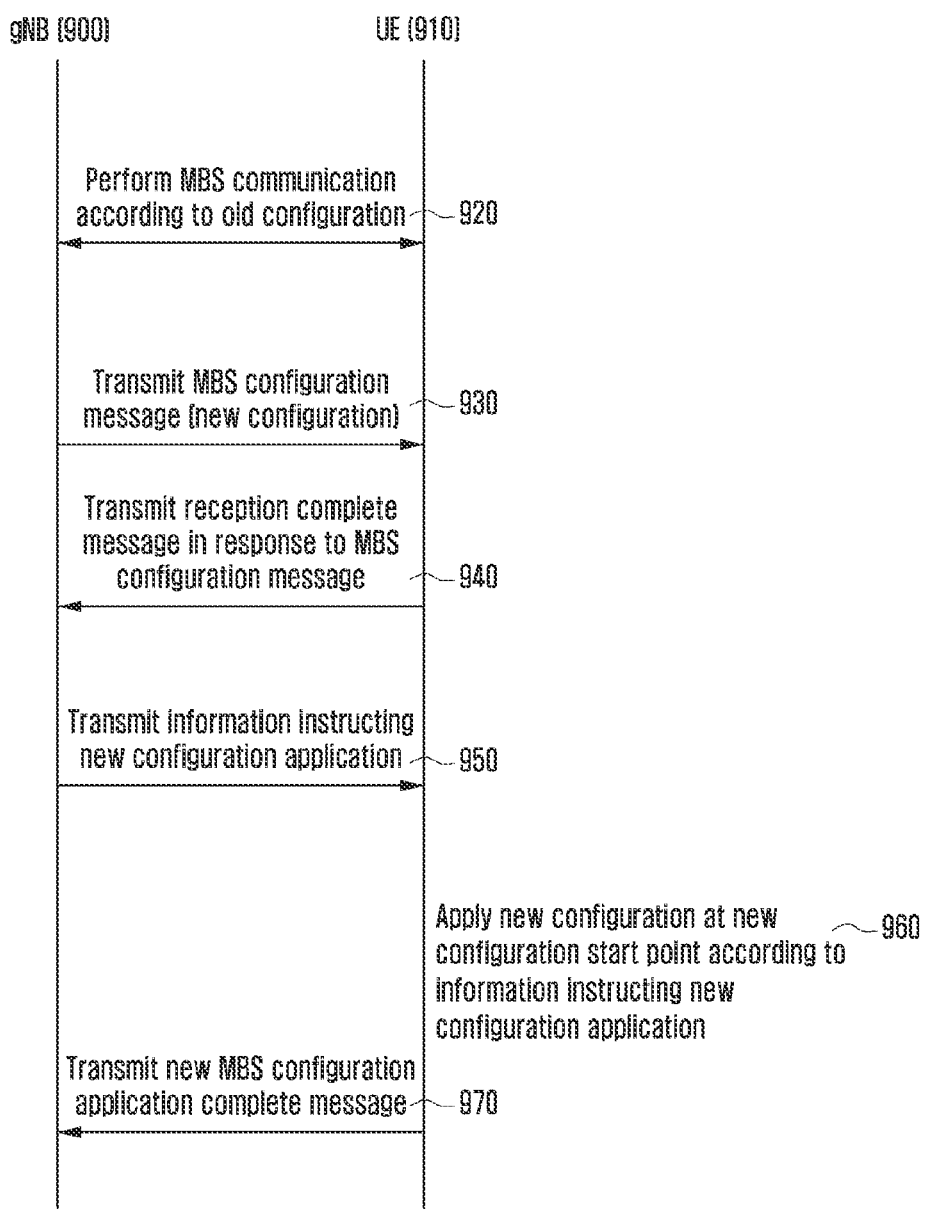
FIG. 9 is a flow diagram illustrating a scheme of handling messages for the configuration for MBS communication according to an embodiment of the disclosure.

FIG. 9 is a flow diagram illustrating a scheme of handling messages for the configuration for MBS communication according to an embodiment of the disclosure.

In FIG. 9, it is assumed that each UE performs MBS communication by applying the existing configuration (920) after receiving an RRC reconfiguration message or a system information block.

When the base station needs to change the configuration for MBS communication, it may transmit a message for changing the corresponding configuration to the UE (930). The base station may instruct to change the configuration for MBS communication by using an RRC reconfiguration message or system information block, but the time points at which this message arrives to the UEs may be different. The message conveying the configuration for MBS communication may be not successfully transmitted in the initial transmission and may experience a delay due to retransmission, or the message conveying the configuration for MBS communication may be different for individual UEs, which may cause a difference in transmission time. However, since the time point at which the base station applies the new configuration becomes one time point, the time point at which the new configuration is applied needs to be the same between the UEs performing MBS communication. Hence, the message for changing the configuration for MBS communication may include information on the time point at which the new configuration is applied. This embodiment shows a scheme in which the base station notifies the UEs that the configuration for MBS communication should be applied at the time 960 of applying the configuration for MBS communication by transmitting DCI or MAC CE. This DCI or MAC CE may include information instructed by the base station to the UE that the configuration for MBS communication preset at step 930 should be actually applied. If plural configurations have been delivered to the UE at step 930, the DCI or MAC CE may include a configuration ID to identify the configuration to be applied. Thereby, the UE can determine the configuration to be applied for MBS communication. A UE configured with a new configuration for MBS communication may apply the new configuration immediately upon receiving the corresponding DCI or MAC CE (960). However, in another embodiment, the corresponding configuration may be applied after a preset time from the time when the corresponding DCI or MAC CE is received.

Even if the UE 910 receives a configuration message for MBS communication from the base station 900 (930), the UE 910 may not immediately apply the configuration for MBS communication indicated in this message. Instead, it is necessary to notify the base station that the configuration message for corresponding MBS communication has been successfully received. To this end, when the UE successfully receives a configuration message for MBS communication and completes decoding of it, the UE may transmit the base station a message indicating completion of reception of the corresponding configuration (940). Then, the UE may receive information instructing that the configuration should be applied at the time point of applying the configuration for MBS communication from the base station (950). The UE may apply the new configuration for MBS communication based on this information. Then, the UE may transmit the base station a configuration application complete message informing that the configuration for the corresponding MBS communication has been applied (960). This message may include an RRC reconfiguration complete message or contents indicating that the MBS communication related settings have been applied.

Figure 10:
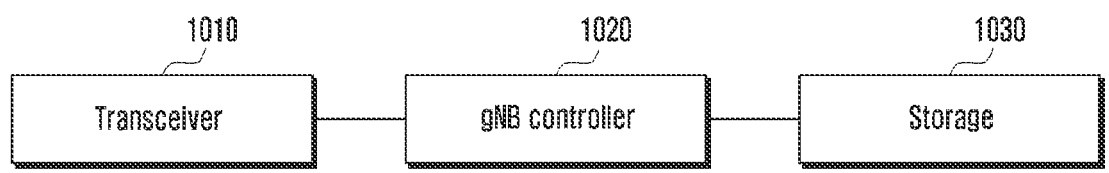
FIG. 10 is a diagram illustrating the structure of a base station according to an embodiment of the disclosure.

FIG. 10 is a diagram illustrating the structure of a base station according to an embodiment of the disclosure.

With reference to FIG. 10 the base station may include a transceiver 1010, a controller 1020, and a storage 1030. In the disclosure, the controller 1020 may be defined as a circuit, an application-specific integrated circuit, or at least one processor.

The transceiver 1010 may transmit and receive signals to and from other network entities.

The transceiver 1010 may transmit, for example, system information to a UE, and may transmit a synchronization signal or a reference signal.

The controller 1020 may control the overall operation of the base station according to the embodiment proposed in the disclosure. For example, the controller 1020 may control signal flows between blocks to perform operations according to the flow diagrams described above.

The storage 1030 may store at least one of information transmitted and received through the transceiver 1010 or information generated through the controller 1020.

Figure 11:
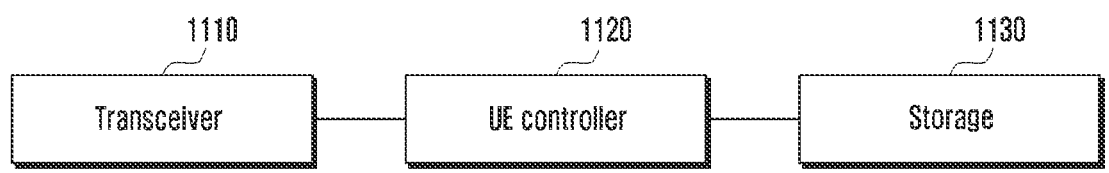
FIG. 11 is a diagram illustrating the structure of a UE according to an embodiment of the disclosure.

FIG. 11 is a diagram illustrating the structure of a UE according to an embodiment of the disclosure.

With reference to FIG. 11, the UE may include a transceiver 1110, a controller 1120, and a storage 1130. In the disclosure, the controller may he defined as a circuit, an application-specific integrated circuit, or at least one processor.

The transceiver 1110 may transmit and receive signals to and from other network entities.

The transceiver 1110 may receive, for example, system information from a base station, and may receive a synchronization signal or a reference signal.

The controller 1120 may control the overall operation of the UE according to the embodiment proposed in the disclosure. For example, the controller 1120 may control signal flows between blocks to perform operations according to the flow diagrams described above.

The storage 1130 may store at least one of information transmitted and received through the transceiver 1110 or information generated through the controller 1120.

Meanwhile, the embodiments disclosed in the present specification and drawings are presented as specific examples to easily explain the technical contents of the disclosure and help the understanding of the disclosure, and are not intended to limit the scope of the disclosure. That is, it is apparent to those of ordinary skill in the art to which the disclosure pertains that it is possible to practice other modifications based on the technical spirit of the disclosure in addition, the above embodiments may be operated in combination with each other as needed.

The invention claimed is:

1. A method performed by a base station for multicast and broadcast service (MBS) communication, the method comprising:

transmitting, to a user equipment (UE), a message related to a configuration for MBS communication;

in case that the message related to the configuration for the MBS communication includes information on a time point of applying the configuration for the MBS communication:

receiving, from the UE, a reception complete message indicating that the message related to the configuration for the MBS communication has been received; and receiving, from the UE, an application complete message indicating that the configuration for the MBS communication has been applied, in case that the configuration for the MBS communication is applied to the UE; and in case that the message related to the configuration for the MBS communication does not include information on the time point of applying the configuration for the MBS communication;

receiving, from the UE, only one of the reception complete message and the application complete message.

2. The method of claim 1, wherein the information on the time point of applying the configuration for the MBS communication includes at least one of a system frame number (SFN) value, a subframe number, a slot number, or a symbol number.

3. A method performed by a user equipment (UE) for multicast and broadcast service (MBS) communication, the method comprising:

receiving, from a base station, a message related to a configuration for the MBS communication;

applying the configuration for the MBS communication based on the message related to the configuration for the MBS communication;

in case that the message related to the configuration for the MBS communication includes information on a time point of applying the configuration for the MBS communication:

transmitting, to the base station, a reception complete message indicating that the message related to the configuration for the MBS communication has been received; and transmitting, to the base station, an application complete message indicating that the configuration for MBS communication has been applied; and in case that the message related to the configuration for the MBS communication does not include information on the time point of applying the configuration for the MBS communication, transmitting, to the base station, only one of the reception complete message and the application complete message.

4. The method of claim 3, wherein the information on the time point of applying the configuration for the MBS communication includes at least one of a system frame number (SFN) value, a subframe number, a slot number, or a symbol number.

5. A base station for multicast and broadcast service (MBS) communication, the base station comprising:

a transceiver;

a controller coupled with the transceiver, and configured to:

transmit to a user equipment (UE), a message related to a configuration for the MBS communication, in case that the message related to the configuration for the MBS communication includes information on a time point of applying the configuration for the MBS communication:

receive, from the UE, a reception complete message indicating that the message related to the configuration for the MBS communication has been received; and receive, from the UE, an application complete message indicating that the configuration for the MBS communication has been applied, in case that the configuration for the MBS communication is applied to the UE; and in case that the message related to the configuration for the MBS communication does not include information on the time point of applying the configuration for the MBS communication, receive, from the UE, only one of the reception complete message and the application complete message.

6. The base station of claim 5, wherein the information on the time point of applying the configuration for the MBS communication includes at least one of a system frame number (SFN) value, a subframe number, a slot number, or a symbol number.

7. A user equipment (UE) for a multicast and broadcast service (MBS) communication, the UE comprising:
   a transceiver; and
   a controller coupled with the transceiver, and configured to:
      receive, from a base station, a message related to a configuration for the MBS communication; and
      apply the configuration for the MBS communication based on the message related to the configuration for the MBS communication,
   in case that the message related to the configuration for the MBS communication includes information on a time point of applying the configuration for the MBS communication:
      transmit, to the base station, a reception complete message indicating that the message related to the configuration for the MBS communication has been received, and
      transmit, to the base station, an application complete message indicating that the configuration for MBS communication has been applied; and
   in case that the message related to the configuration for the MBS communication does not include information on the time point of applying the configuration for the MBS communication, transmit, to the base station, only one of the reception complete message and the application complete message.

8. The UE of claim 7, wherein the information on the time point of applying the configuration for the MBS communication includes at least one of a system frame number (SFN) value, a subframe number, a slot number, or a symbol number.

* * * * *